United States Patent
Ryon et al.

(10) Patent No.: US 11,555,450 B1
(45) Date of Patent: Jan. 17, 2023

(54) FUEL INJECTORS WITH HEAT EXCHANGERS

(71) Applicant: Delavan Inc., West Des Moines, IA (US)

(72) Inventors: Jason Ryon, Carlisle, IA (US); Gregory A. Zink, Des Moines, IA (US); Brandon Phillip Williams, Johnston, IA (US); Lev A. Prociw, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/406,657

(22) Filed: Aug. 19, 2021

(51) Int. Cl.
| | | |
|---|---|---|
| F02C 7/141 | (2006.01) | |
| F02C 7/264 | (2006.01) | |
| F02C 7/224 | (2006.01) | |
| F02C 7/16 | (2006.01) | |

(52) U.S. Cl.
CPC .............. *F02C 7/141* (2013.01); *F02C 7/16* (2013.01); *F02C 7/224* (2013.01); *F02C 7/264* (2013.01); *F05D 2220/323* (2013.01); *F05D 2240/35* (2013.01); *F05D 2260/213* (2013.01); *F05D 2260/232* (2013.01); *F05D 2260/30* (2013.01); *F05D 2260/99* (2013.01)

(58) Field of Classification Search
CPC .. F02C 7/16; F02C 7/141; F02C 7/224; F02C 7/222; F02C 7/264; F05D 2220/323; F05D 2240/35; F05D 2260/213; F05D 2260/232; F05D 2260/30; F05D 2260/99; F23R 3/283; F23R 3/286; F23R 3/02; F23R 3/04
See application file for complete search history.

(56) References Cited

U.S. PATENT DOCUMENTS

| | | | |
|---|---|---|---|
| 3,472,025 A | | 10/1969 | Lapera et al. |
| 5,211,003 A | * | 5/1993 | Samuel ................... F02C 6/08 60/751 |
| 5,735,115 A | * | 4/1998 | Maghon ................... F23R 3/28 60/746 |
| 8,943,827 B2 | | 2/2015 | Prociw et al. |
| 9,109,842 B2 | | 8/2015 | Prociw et al. |
| 10,400,674 B2 | | 9/2019 | Xu |
| 10,830,150 B2 | | 11/2020 | Snyder et al. |
| 11,029,029 B2 | | 6/2021 | Lakshmanan |
| 11,118,784 B2 | * | 9/2021 | Sweeney ................. F02C 3/06 |
| 2015/0323186 A1 | | 11/2015 | Xu |
| 2016/0131040 A1 | * | 5/2016 | Agg ........................ F28D 7/024 60/785 |
| 2017/0218845 A1 | * | 8/2017 | Snyder .................... F23R 3/283 |
| 2018/0266691 A1 | | 9/2018 | Sweeney et al. |
| 2018/0291812 A1 | | 10/2018 | Payne et al. |
| 2020/0123920 A1 | | 4/2020 | Sheath et al. |
| 2020/0217510 A1 | | 7/2020 | Sampath et al. |
| 2021/0156310 A1 | | 5/2021 | Prociw et al. |

\* cited by examiner

*Primary Examiner* — Craig Kim
(74) *Attorney, Agent, or Firm* — Locke Lord LLP; Joshua L. Jones; Scott D. Wofsy

(57) ABSTRACT

A method of producing compressed air for use onboard an aircraft includes receiving compressor discharge air into an air channel of a fuel injector. The method also includes cooling the compressor discharge air within the air channel by heat exchange with fuel flowing in the fuel injector, and issuing cooled air from the internal air channel out of an engine case as a source of compressed air.

17 Claims, 5 Drawing Sheets

FUEL INJECTORS WITH HEAT EXCHANGERS

BACKGROUND

1. Field

The present disclosure relates generally to fuel and air systems for gas turbine engines, and more particularly to fuel injectors for gas turbine engines.

2. Description of Related Art

A portion of the compressor discharge air in a gas turbine engine can be diverted from the main gas flow though the engine for various uses in the engine and onboard an aircraft. However, this air is typically too hot to be of use in general applications. Fuel air heat exchangers can be used to cool the diverted portion of compressed air. However, fuel air heat exchangers are not typically easy to retrofit on existing engine designs and this among other things leaves a need in the art for improved systems and methods for fuel air heat exchange. This disclosure provides a solution for this need.

SUMMARY

A fuel injector system for a gas turbine engine includes a mounting flange configured to be mounted to an engine case. A fixture extends in an outward direction from the mounting flange operable to connect to fuel and air systems outside the engine case. A feed arm extends radially inward from the mounting flange. A fuel nozzle extends from the feed arm and is operable to issue fuel into a combustor. A fuel channel extends from an inlet, through the feed arm, and out an outlet of the fuel nozzle. An air channel extends from an inlet in the feed arm and/or nozzle, through the feed arm, and to an outlet in the fixture. The fuel channel and the air channel are in fluid isolation from one another to maintain separation of fuel and air. The fuel channel and the air channel are in thermal communication with one another as a heat exchanger to cool air in the air channel and heat fuel in the fuel channel.

The heat exchanger can be a counter flow heat exchanger. The inlet of the air channel can be in the feed arm between the fuel nozzle and the mounting flange. The fuel channel can include a tube extending from the mounting flange to the fuel nozzle, and the air channel can be defined in an annular space between an outer envelope of the feed arm and the tube.

The tube can include a coiled section of the tube configured to provide residence time for fuel passing through the heat exchanger. The flange can be mounted to an engine case, and the feed arm can include a heat exchanger section. The coiled section can be in the heat exchanger section, and the heat exchanger section can extend inward from the mounting flange into the engine case. There need be no o-rings sealing directly between the air channel in the heat exchanger section and the engine case, and there need be no o-rings sealing directly between the fuel channel in the heat exchanger section and the engine case.

The nozzle can be mounted proximate to and in fluid communication through a combustor dome wall to issue fuel into a space on a combustor side of the combustor dome wall. The inlet of the air channel can be in a position to receive compressor discharge air from a compressor side of the combustor dome wall opposite the space on the combustor side of the combustor dome wall.

It is also contemplated that the inlet of the air channel can be in the fuel nozzle. The fuel channel and air channel can be in intimate thermal contact through a heat exchanger wall for a majority of the fuel nozzle with respect to axial length of the fuel nozzle. The inlet of the air channel can be in an axial end of the fuel nozzle, and the outlet of the fuel channel can be in the axial end of the fuel nozzle. The inlet of the air channel can be on a radially outward facing portion of the fuel nozzle. The inlet of the air channel can be on a radially inward facing portion of the fuel nozzle.

The fuel channel and the air channel can be in intimate thermal communication with one another through a heat exchanger wall in the feed arm. The flange can be mounted to an engine case, wherein the feed arm includes a heat exchanger section. At least one of the feed arm and fuel nozzle can include a coiled section of the fuel and/or air channels that is in the heat exchanger section, wherein the heat exchanger section extends within the engine case. There need be no o-rings sealing directly between the air channel and the engine case.

A method of producing compressed air for use onboard an aircraft includes receiving compressor discharge air into an air channel of a fuel injector. The method also includes cooling the compressor discharge air within the air channel by heat exchange with fuel flowing in the fuel injector, and issuing cooled air from the internal air channel out of an engine case as a source of compressed air. The method can include reversing direction of airflow in the air channel to provide air assist for ignition of fuel flowing in the fuel injector.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
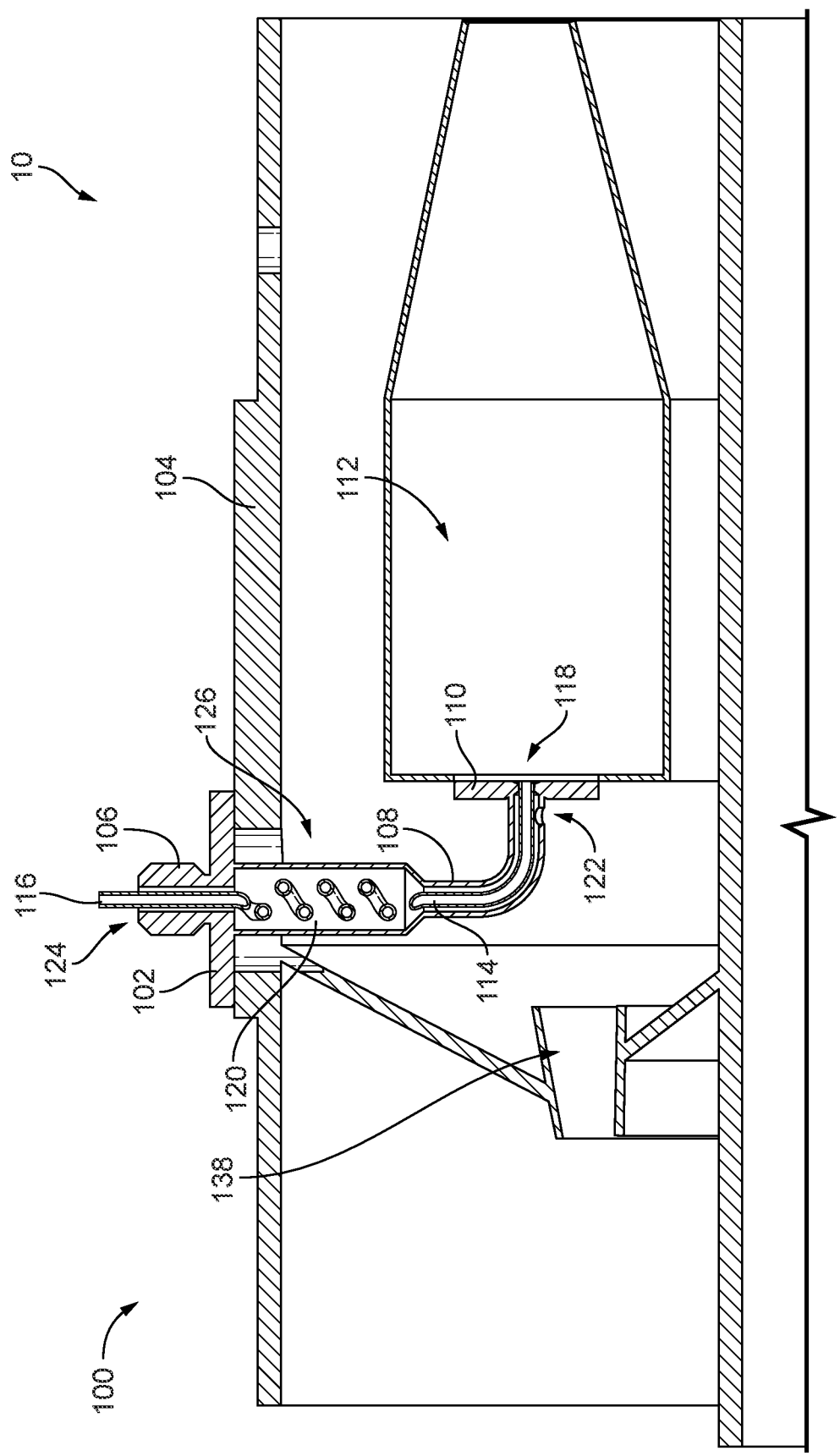
FIG. 1 is a schematic cross-sectional view of an embodiment of a system constructed in accordance with the present disclosure, showing a fuel injector with an integrated fuel air heat exchanger extending into the engine case.

Reference will now be made to the drawings wherein like reference numerals identify similar structural features or aspects of the subject disclosure. For purposes of explanation and illustration, and not limitation, a partial view of an embodiment of a fuel injector in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to provide fuel nozzles with integrated fuel air heat exchangers readily retrofittable into existing engines as well as new engines.

The system includes a fuel injector 100 for a gas turbine engine 10, which includes a mounting flange 102 mounted to the engine case 104. A fixture 106 extends in an outward direction from the mounting flange 104 operable to connect to fuel and air systems outside the engine case 104. A feed arm 108 extends radially inward from the mounting flange 104. A fuel nozzle 110 extends from the feed arm 108 and is operable to issue fuel into a combustor 112. A fuel channel 114 extends from an inlet 116, through the feed arm 108, and out an outlet 118 of the fuel nozzle 110. An air channel 120 extends from an inlet 122 in the feed arm 108, through the feed arm 108, and to an outlet 124 in the fixture 106. The fuel channel 114 and the air channel 120 are in fluid isolation from one another to maintain separation of fuel and air. The fuel channel 114 and the air channel 120 are in thermal communication with one another as a heat exchanger 126 to cool air in the air channel 120 and to heat, e.g. pre-heat, fuel in the fuel channel 114.

Figure 2:
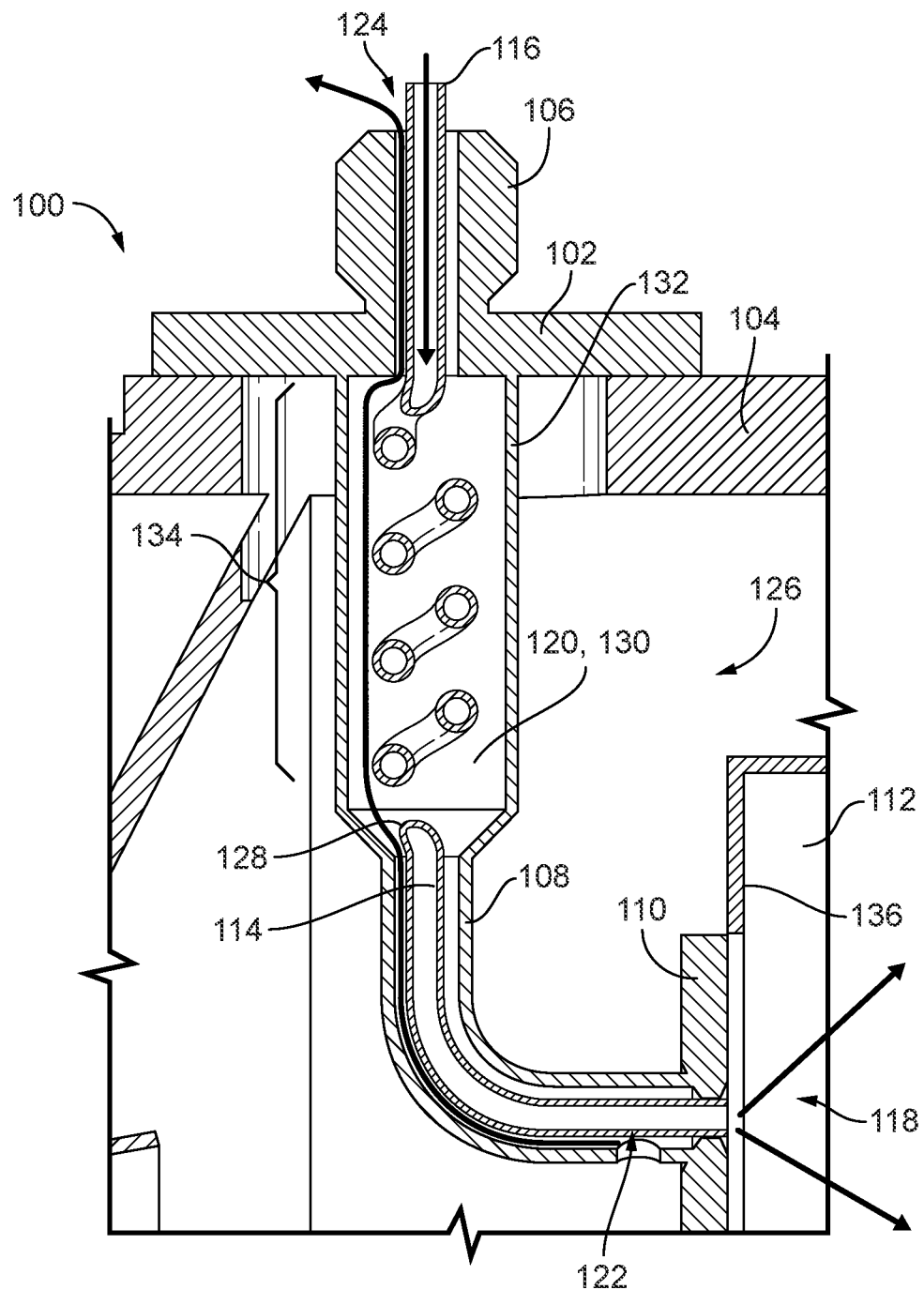
FIG. 2 is a schematic cross-sectional view of the fuel injector of FIG. 1, showing the air and fuel channels of the fuel air heat exchanger.

With reference now to FIG. 2, and as indicated by the flow arrows, the heat exchanger 126 is a counter flow heat exchanger. The inlet 122 of the air channel 120 is in the feed arm 108 between the fuel nozzle 110 and the mounting flange 102, and closer to the fuel nozzle 110 than to the flange 102. The fuel channel 114 includes a tube 128 extending from the mounting flange 102 to the fuel nozzle 110. The air channel 120 is defined in an annular space 130 between an outer envelope 132 of the feed arm 108 and the tube 128. The inlet 122 is an opening through the outer envelope 132. The tube 128 serves as a heat exchanger wall through which heat is conducted from the hot air to the cool fuel. The single tube 128 shown is a simple heat exchanger. However it is contemplated that more elaborate heat exchangers can be used in the same location to increase the shared conductive wall in order to enhance heat transfer without departing from the scope of this disclosure. The tube 128 keeps the fuel and air in thermal communication with one another, and in fluid isolation from one another. The tube 128 and other components of the fuel injector 100 can be assembled using brazing, welding, additive manufacturing, and/or any other suitable techniques.

The tube 128 includes a coiled section of the tube 128 configured to provide residence time for fuel passing through the heat exchanger 126. The feed arm 108 includes a heat exchanger section 134, and the coiled section of the tube 128 is in the heat exchanger section 134. The heat exchanger section 134 extends inward from the mounting flange 104 into the engine case 104. There need be no o-rings sealing for air directly between the air channel 120 in the heat exchanger section 134 and the engine case 104, however there can be o-rings sealing fuel in the fuel channel 114 as needed. Similarly, there need be no o-rings sealing directly between the fuel channel 114 in the heat exchanger section 134 and the engine case 104. It is therefore a relatively straightforward retrofit of an existing engine or engine design, which involves little more than replacement of conventional fuel injectors with a fuel injector 100, to provide a supply of cool, useful compressed air outside the engine case 104. The outlet 124 of the air channel 120 simply needs to be connected to an air system ready to receive the compressed air.

With continued reference to FIG. 2, the nozzle 110 is mounted proximate to and in fluid communication through the combustor dome wall 136 to issue fuel into a space on a combustor side of the combustor dome wall 136 as indicated by the diverging spray arrows in FIG. 2. The inlet 122 of the air channel 120 is in a position to receive compressor discharge air from a compressor side (the compressor diffuser 138 is labeled in FIG. 1) of the combustor dome wall 136 opposite the combustor space on the combustor side of the combustor dome wall 136. Other inlet locations for the air channel 120 are also contemplated, as described below with reference to FIGS. 3-5.

Figure 3:
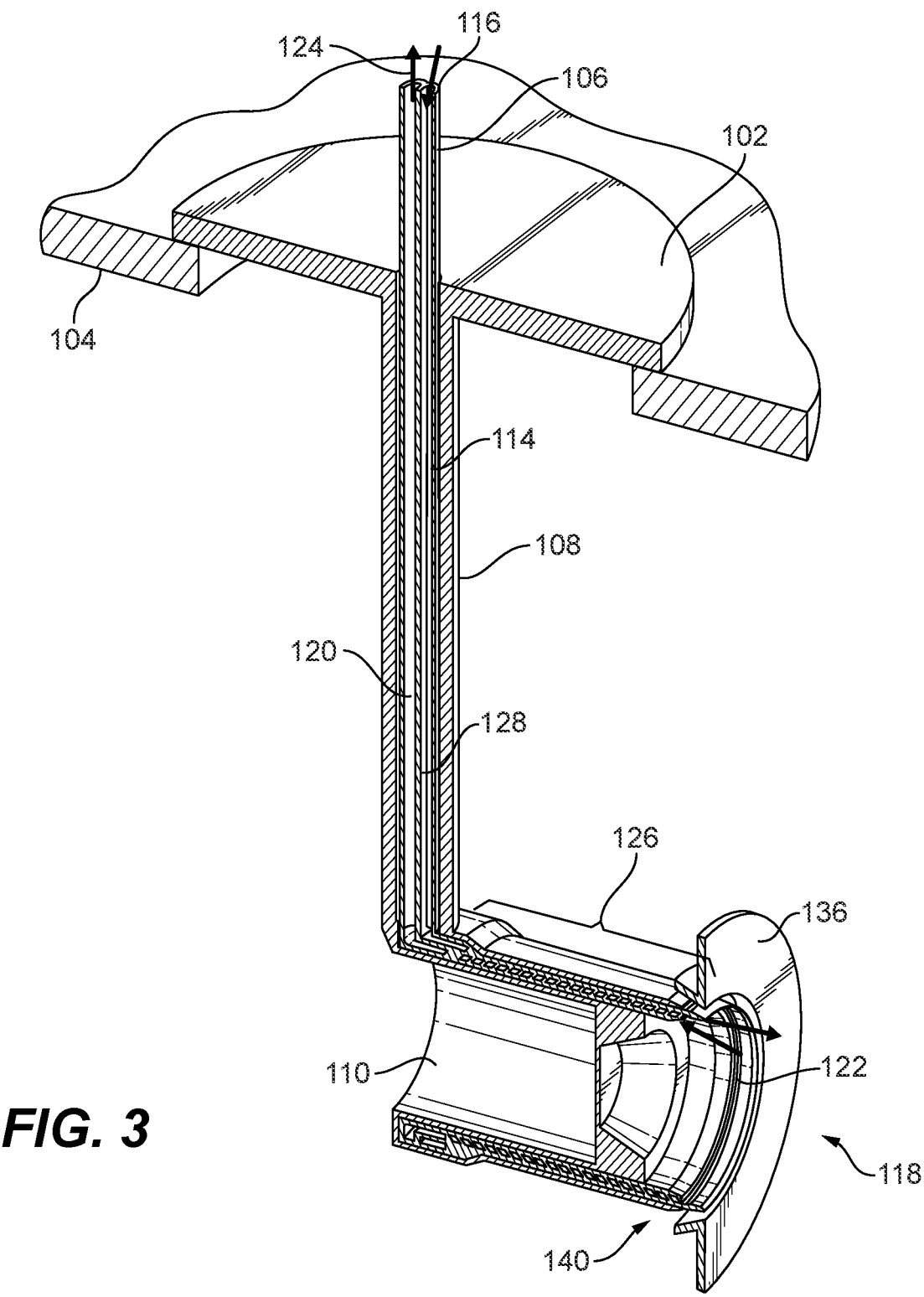
FIG. 3 is a schematic cross-sectional perspective view of another exemplary embodiment of a fuel injector, showing an integrated fuel air heat exchanger with an air inlet in the fuel nozzle.

With reference now to FIG. 3, another embodiment of a fuel injector 100 is shown with a different heat exchanger inlet and configuration from that shown in FIGS. 1-2. The inlet 122 of the air channel 120 is in the fuel nozzle 110 in this case. The fuel channel 114 and air channel 120 are in intimate thermal contact through a heat exchanger wall 128 (labeled in FIG. 4) for a majority of the fuel nozzle 110 with respect to axial length L of the fuel nozzle 110. The inlet 122 of the air channel 120 is in an axial end 140 of the fuel nozzle 110. The outlet 118 of the fuel channel 114 is in the axial end 140 of the fuel nozzle 110 as well. In FIG. 5, the inlet 122 of the air channel 120 is shown, along with two other possible inlet locations. First, is an inlet 142 on a radially outward facing portion of the fuel nozzle 110 in fluid communication with an insulation gap 146. Another is an inlet 144 on a radially inward facing portion of the fuel nozzle 110.

Figure 4:
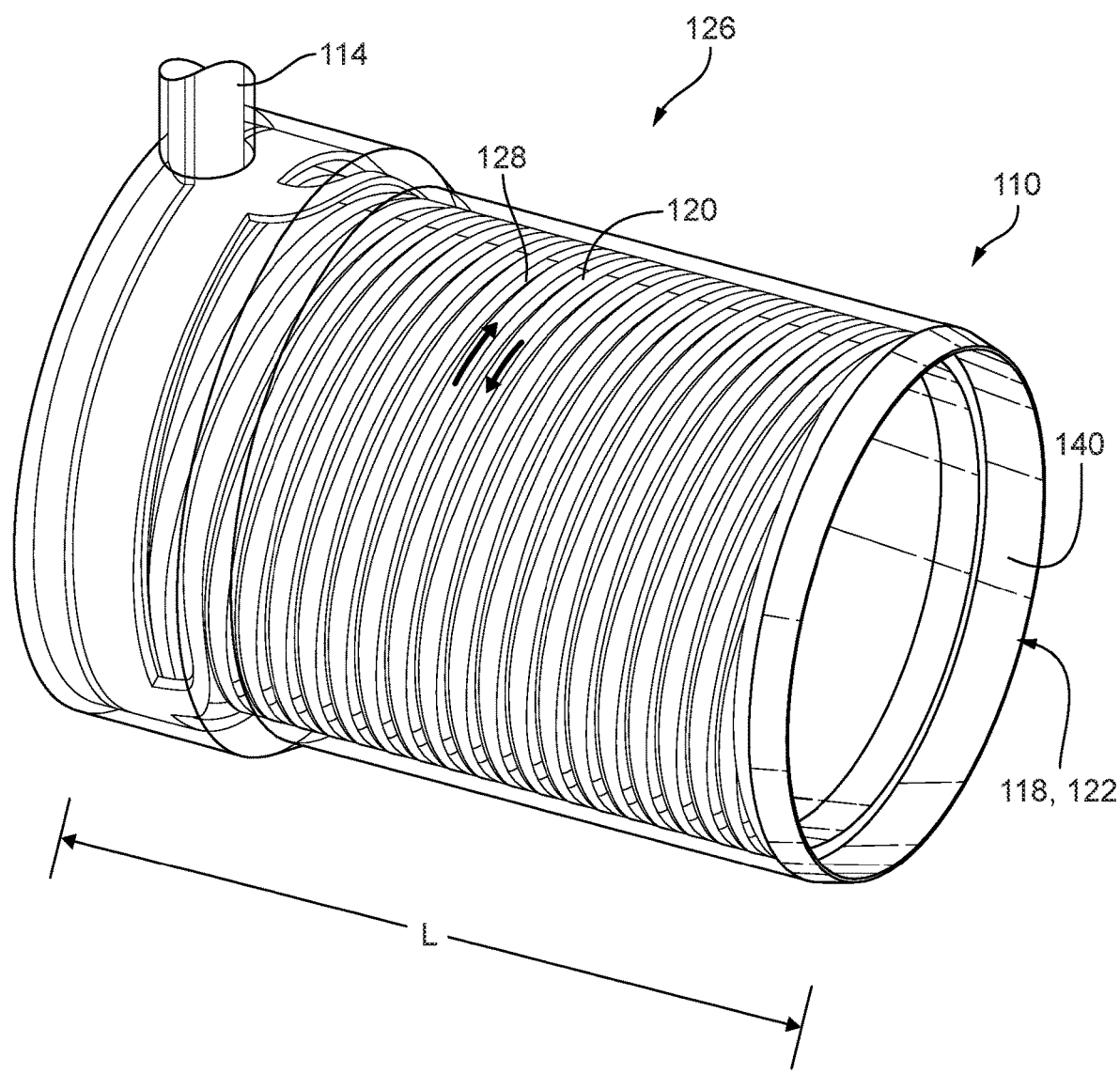
FIG. 4 is a schematic perspective view of a portion of the fuel injector of FIG. 3, schematically showing the counter flowing air channel and fuel distributor channels.
Figure 5:
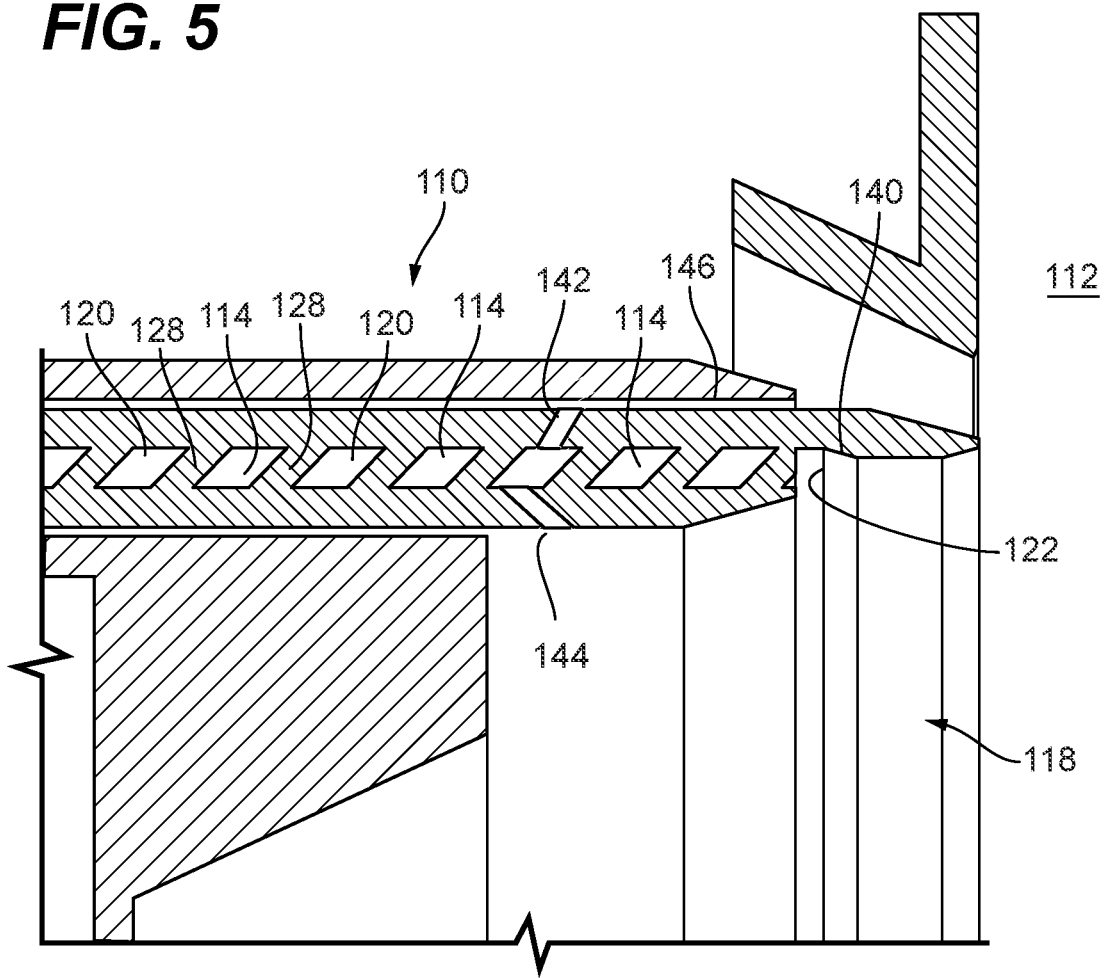
FIG. 5 is a schematic cross-sectional side elevation view of a portion of the fuel nozzle of FIG. 3, showing air channel inlet locations.

The fuel channel 114 and the air channel 120 are in intimate thermal communication with one another through a heat exchanger wall 128 in the feed arm 108 (as shown in FIG. 3), in addition to the thermal contact through the fuel distributor portion of the fuel nozzle 110 (as shown in FIGS. 4-5). It is also contemplated that a fuel injector can be a heat exchanger section in its substantial entirety, for example, all the way from the inlet flange 102 to the nozzle exit tip 118. As shown in FIG. 3, the feed arm 208 is just a straight member with straight channels, but could be helical as well similar to the fuel nozzle 110 to allow for increased heat transfer. Also, the feed arm 108 can be coiled like a coiled tube to allow for thermal compliance. The flange 102 is mounted to an engine case 104. At least one of the feed arm 108 and fuel nozzle 110 include a coiled section (e.g., as shown in FIG. 4) of the fuel and/or air channels 114, 120 that is in the heat exchanger section, wherein the heat exchanger section extends within the engine case 104. As with FIG. 1, in FIGS. 3-5 there need be no o-rings sealing directly between the engine case 104 and either of the air channel 120 or the fuel channel 114. Instead, fuel and air communicate through the engine case 104 through the fixture 106. Depending on the specific nozzle configuration, some locations are better to prevent fuel from entering into the air circuit. For example, if air was directly taken in the same area where fuel is injected, some fuel might be taken into the air cavity, which would be better to avoid. The structure shown in FIGS. 4-5 can be made by additive manufacturing, for example.

A method of producing compressed air, e.g. for use onboard an aircraft, includes receiving compressor discharge air into an air channel, e.g. air channel 120, of a fuel injector, e.g. fuel injector 100. The method also includes cooling the compressor discharge air within the air channel by heat exchange with fuel flowing in the fuel injector, and issuing cooled air from the internal air channel out of an engine case, e.g. engine case 104, as a source of compressed air. The method can include reversing direction of airflow in the air channel to provide air assist for ignition of fuel flowing in the fuel injector.

Potential benefits include a high pressure, cooled air stream available for cooling other parts of the engine or airplane. There are strong safety factors achieved by locating the fuel air heat exchanger inside of the engine case. As the fuel is not heated until it is within the fuel injector feed arm cavity, elastomeric seals can still be used to connect the fuel manifold to the fuel injector without melting the seals. Velocities of the fuel are also at the highest in the fuel injector, which allows for more heat transfer than slow moving fuel locations. Heat exchange is also in a counter-flow direction (inlet of fuel and inlet of air are at opposite sides of the heat exchanger), which enhances heat transfer. In reverse operation, there can be compressed air added through the fuel injector which acts both as cooling air if needed, as well as an air assist to provide additional fuel atomization, for example at engine startup or altitude relight. Fuel can continue to heat exchange with air all the way up the feed arm. Larger or smaller air and fuel circuits can be used to tailor heat transfer rates. Temperature sensors can be integral to the fuel distributer tip and air flow rates controlled with a valve to prevent overheating the fuel temperatures.

The methods and systems of the present disclosure, as described above and shown in the drawings, provide for fuel nozzles with integrated fuel air heat exchangers readily retrofittable into existing engines as well as new engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel injector system for a gas turbine engine comprising:
   a mounting flange configured to be mounted to an engine case;
   a fixture extending in an outward direction from the mounting flange operable to connect to fuel and air systems outside the engine case;
   a feed arm extending radially inward from the mounting flange;
   a fuel nozzle extending from the feed arm and operable to issue fuel into a combustor;
   a fuel channel extending from an inlet, through the feed arm, and out an outlet of the fuel nozzle; and
   an air channel extending from an inlet in the feed arm and/or nozzle, through the feed arm, and to an outlet in the fixture, wherein the fuel channel and the air channel are in fluid isolation from one another, and wherein the fuel channel and the air channel are in thermal communication with one another, wherein the heat exchanger is a counter flow heat exchanger.

2. The system as recited in claim 1, wherein the inlet of the air channel is in the feed arm between the fuel nozzle and the mounting flange.

3. The system as recited in claim 2, wherein the fuel channel includes a tube extending from the mounting flange to the fuel nozzle, and wherein the air channel is defined in an annular space between an outer envelope of the feed arm and the tube.

4. The system as recited in claim 3, wherein the tube includes a coiled section of the tube.

5. The system as recited in claim 4, wherein the flange is mounted to an engine case, wherein the feed arm includes a heat exchanger section, wherein the coiled section is in the heat exchanger section, and wherein the heat exchanger section extends inward from the mounting flange into the engine case.

6. The system as recited in claim 5, wherein there are no o-rings sealing directly between the air channel in the heat exchanger section and the engine case.

7. The system as recited in claim 5, wherein there are no o-rings sealing directly between the fuel channel in the heat exchanger section and the engine case.

8. The system as recited in claim 2, further comprising a combustor dome wall, wherein the nozzle is mounted proximate to and in fluid communication through the combustor dome wall to issue fuel into a space on a combustor side of the combustor dome wall, wherein the inlet of the air channel is in a position to receive compressor discharge air from a compressor side of the combustor dome wall opposite the space on the combustor side of the combustor dome wall.

9. A fuel injector system for a gas turbine engine comprising:
   a mounting flange configured to be mounted to an engine case;
   a fixture extending in an outward direction from the mounting flange operable to connect to fuel and air systems outside the engine case;
   a feed arm extending radially inward from the mounting flange;
   a fuel nozzle extending from the feed arm and operable to issue fuel into a combustor;
   a fuel channel extending from an inlet, through the feed arm, and out an outlet of the fuel nozzle; and
   an air channel extending from an inlet in the feed arm and/or nozzle, through the feed arm, and to an outlet in the fixture, wherein the fuel channel and the air channel are in fluid isolation from one another, and wherein the fuel channel and the air channel are in thermal communication with one another, wherein the inlet of the air channel is in the fuel nozzle.

10. The system as recited in claim 9, wherein the fuel channel and air channel are in intimate thermal contact through a heat exchanger wall for a portion of the fuel nozzle with respect to axial length of the fuel nozzle.

11. The system as recited in claim 10, wherein the inlet of the air channel is in an axial end of the fuel nozzle, and wherein the outlet of the fuel channel is in the axial end of the fuel nozzle.

12. The system as recited in claim 10, wherein the inlet of the air channel is on a radially outward facing portion of the fuel nozzle.

13. The system as recited in claim 10, wherein the inlet of the air channel is on a radially inward facing portion of the fuel nozzle.

14. The system as recited in claim 10, wherein the fuel channel and the air channel are in intimate thermal contact with one another through a heat exchanger wall in the feed arm.

15. The system as recited in claim 9, wherein the flange is mounted to an engine case, wherein the feed arm includes a heat exchanger section, wherein at least one of the feed arm and fuel nozzle include a coiled section of the fuel and/or air channels that is in the heat exchanger section, and wherein the heat exchanger section extends within the engine case.

16. The system as recited in claim 15, wherein there are no o-rings sealing directly between the air channel and the engine case.

17. A method of producing compressed air for use onboard an aircraft comprising:
  receiving compressor discharge air into an air channel of a fuel injector;
  cooling the compressor discharge air within the air channel by heat exchange with fuel flowing in the fuel injector;
  issuing cooled air from the internal air channel out of an engine case as a source of compressed air; and
  reversing direction of airflow in the air channel to provide air assist for ignition of fuel flowing in the fuel injector.

* * * * *